Oct. 13, 1942.  W. L. CALLENDER  2,298,675
MECHANICAL MOVEMENT
Filed Sept. 17, 1941
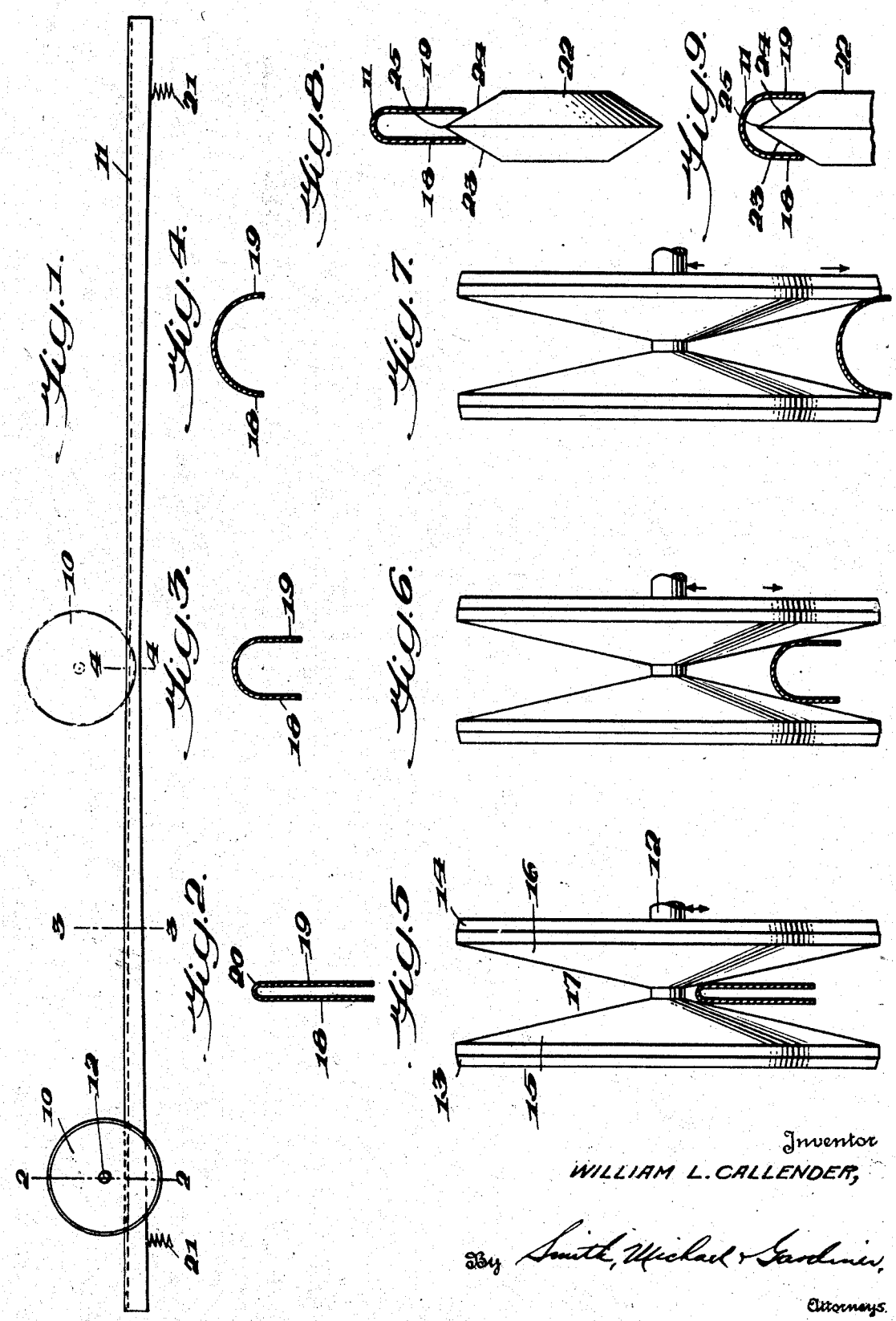
Inventor
WILLIAM L. CALLENDER, Patented Oct. 13, 1942

2,298,675

UNITED STATES PATENT OFFICE 2,298,675

MECHANICAL MOVEMENT

William L. Callender, Washington, D. C., assignor of one-third to Florian F. Mack, Takoma Park, Md., and one-third to Hayden S. Garber, Washington, D. C.

Application September 17, 1941, Serial No. 411,210

10 Claims. (Cl. 74—25)

This invention relates to a mechanical movement and more particularly is directed to conversion of rotary to lineal movement, or vice versa. It is likewise capable of converting rotary movement of one element into rotary movement of its coperating element, and while, for the sake of simplicity, I have illustrated only conversion of rotary to reciprocating or lineal movement, it is to be understood that the invention embraces broadly the conversion of one movement to another with provision for accelerating and/or decelerating the speed of motion of the driven element, or in other words, varying the ratio of velocities between driving and driven elements.

It is well known that the surface speed of the periphery of a rotating wheel or disc is higher than that of its hub since the greater the circle of revolution, the more surface passes a fixed point in the same amount of time. By utilizing this principle the present invention provides in a very simple, inexpensive and reliable manner, means for causing an acceleration or deceleration of speed of the driven element.

It is an object of the present invention, therefore, to provide a simple mechanical construction for accomplishing the above results, without employing movable elements such as clutches, springs, levers or the like which readily wear, break or otherwise require replacement from time to time, and without complicated speed changing mechanisms such as gearing or the like.

Another object is to provide means for accomplishing the foregoing results by mechanism comprising a minimum number of parts so that there is no possibility of the parts becoming lost or misplaced since only a driving and a driven element are employed, each of which consists of an integral unitary structure.

To the accomplishment of the foregoing and related ends, said invention, then, consists of the elements hereinafter fully described and particularly pointed out in the claims; the annexed drawing and the following description setting forth in detail certain structure embodying the invention, such disclosed elements constituting, however, but one of various structural forms in which the principle of the invention may be used.

In the annexed drawing:

Figure 1 is a side elevation with a rotary element shown in solid lines in such position that it would impart minimum linear velocity to its cooperating element, and the rotary element is again shown in dot-and-dash lines in the position where it would impart maximum linear velocity to the driven element.

Figs. 2, 3 and 4 are enlarged sectional views along the lines 2—2, 3—3 and 4—4, respectively, of Fig. 1.

Figs. 5, 6 and 7 correspond to Figs. 2, 3 and 4, respectively, but with the driven element shown in various positions it will assume relative to the axis of rotation of the rotary element as it moves progressively from a position of minimum velocity to the position of maximum velocity.

Figs. 8 and 9 are views corresponding to Figs. 5 and 7, respectively, showing another adaptation of my invention.

Referring more particularly to the drawing, the invention embodies a rotary driving member 10 and a driven member 11 but it is to be clearly understood that the operation of the members may be reversed so that the member 11 moves in a lineal path to impart rotary motion to the member 10. However, for the sake of clarity the members 10 and 11 will be called "driving" and "driven" members, respectively, throughout this description.

The driving member 10 is shown as a rotary member in the form of a wheel, or pulley, carried by a shaft 12 which may be connected to a suitable source of power. The wheel 12 is shown as composed of two discs 13 and 14 carrying opposed conical faces 15 and 16 diverging from each other from the shaft outwardly to the peripheries of the discs. By this construction an outwardly opening V groove 17 is formed between the discs 13 and 14.

The particular construction of the wheel or pulley 10 as above described is not essential to carrying out my invention nor is it necessary that the groove between the discs 13 and 14 be strictly V-shaped. For instance, the pulley may be solid with a groove cut or otherwise formed in its periphery and the groove may take any shape so long as it presents to the driven member 11, opposed, substantially conical surfaces. As a matter of fact, a pulley with a U-shaped groove will function to produce the results of this invention, although to a more limited extent.

The driven member 11 is illustrated in the form of a bar of metal or similar rigid material which is bent upon itself into channel shape in cross-section, with the legs 18 and 19 spaced apart to a limited extent as shown in Fig. 2 to provide a narrow crest 20, and being progressively spread farther apart as shown in Figs. 3 and 4 to produce crests of varying widths.

The bar 11, therefore, varies in width and is progressively flattened out so that when the narrow part of the bar engages the driving pulley, the bar occupies a position nearest the shaft 12, or the center of the pulley 10 (Fig. 5) and the bar is propelled by the frictional engagement therebetween at its lowest speed when the axis 12 is held in fixed position. As movement of the bar 11 progresses relative to the pulley and due to the widening of the crests of the bar, it will assume the position as shown in Fig. 6, i. e., a position intermediate the shaft and periphery of the pulley, and further movement of the bar causes the same to ride on the conical faces 15 and 16 adjacent the periphery of the pulley 10 at which time the bar travels at its highest rate of speed, since the surface speed of the pulley is highest at its periphery.

By reversing the members 10 and 11 it will be seen that reciprocation of the bar 12 will cause rotation of the pulley and that an accelerated or decelerated speed of rotation may be obtained based upon the same principle.

The broad concept, therefore, of the present invention, resides in associating a pulley or wheel having the periphery formed of oppositely inclined conical surfaces and a bar or rod in frictional engagement with the said surfaces, the bar having varying widths to engage the surfaces at different points between the center of rotation of the pulley and the periphery thereof so that by operating the driving member at uniform speed, acceleration and deceleration of movement of the driven member may nevertheless be obtained.

In the form shown the bar 11 is of sheet metal bent upon itself to the desired configuration but it is obvious that any rod or bar, whether hollow or solid, may be employed, so long as it is provided with varying widths to cause the same to move bodily laterally toward or away from the center of the pulley.

It is likewise contemplated herein that the bar 11 may be circular instead of straight in which event rotary-to-rotary conversion will be accomplished.

In Fig. 1 the pulley 10 shown in solid lines is shown engaging the narrowest part of the bar as shown in Fig. 5, whereas at the position indicated in dot-and-dash lines it engages the widest part as shown in Fig. 7. If the pulley in this instance is driven at a uniform angular velocity, with the bar stationary, and were started at one end and were allowed to ride linearly along the bar, it would start at the lowest linear speed, gradually accelerating until the mid-point of the bar were reached (Fig. 7) when it would be travelling at maximum linear velocity, and it would then gradually decelerate in its linear velocity throughout the remainder of its travel along the bar. In this case the bar 11 acts solely as a track.

As illustrated, the pulley in moving over the track will begin its lineal movement at its minimum speed, gradually pick up speed until the widest part of the track has been reached and then be again reduced gradually to its minimum speed of travel on the track. Also, the bar 11 in the form shown, with the pulley in the form shown, cooperates to produce uniform acceleration and deceleration of speed of the linearly moving element. It is to be understood, however, that the above described operation is not all that is contemplated, because it is obvious that the track or rod cooperating with the V-pulley may be varied in width at any point throughout its length and that there may be various arrangements of wide and narrow portions depending upon the type and speed of motion and type and rate of acceleration and/or deceleration desired.

It is to be understood that the form of invention herewith shown and described, is to be taken as one example of the same, and that various changes in the shape, size and arrangement of parts may be resorted to, without departing from the spirit of my invention, or the scope of the subjoined claims.

The conical faces of the discs 13 and 14 may be provided with suitable frictional material such as rubber or the like or, of course, the bar 11 may be coated with a frictional material.

In some cases it is found desirable to utilize springs such as 21 to force the bar into frictional engagement with the conical faces 15 and 16.

In the form shown in Figs. 8 and 9 the bar 11 is the same as already described but the wheel or pulley 22 in this case has its peripheral portion formed with conical faces 23 and 24 converging toward each other from the axis of rotation toward the periphery and meeting at the apex 25.

In this instance the legs 18 and 19 engage the wheel 22 instead of the crest 20 but due to the gradual spread of the legs, engagement of the conical faces 23 and 24 is effected at points varying between the center of rotation of the wheel 22 and the periphery thereof.

It is obvious that the operation of the device just described is the same as the form previously described and utilizes the same principle and that while the rod 11 is shown as lying below the pulley 10 in Fig. 1 and above the wheel in Fig. 8, this can be changed to suit conditions as they arise.

I claim:

1. A mechanical movement comprising a driving element and a driven element, one of said elements comprising a wheel having the peripheral portion thereof presenting oppositely inclined, substantially conical faces, the other element comprising a bar engaging the conical faces and having the distance between its effective conical-face engaging portions varying at different portions throughout its length so that relative movement between said elements causes one of said elements to move bodily toward or away from the center of rotation of the other element.

2. A mechanical movement comprising a driving element and a driven element, one of said elements comprising a wheel having a groove in its periphery, said groove presenting opposed, substantially conical faces, the other element comprising a bar engaging the conical faces of said groove and having the distance between its effective conical-face engaging portions varying at different portions throughout its length so that relative movement between said elements causes engagement therebetween at points varying between the center of rotation of the wheel and the periphery thereof.

3. A mechanical movement comprising a driving element and a driven element, one of said elements comprising a wheel having the peripheral portion thereof presenting oppositely inclined, substantially conical faces, the other element comprising a channel bar engaging the conical faces and having the distance between its effective conical-face engaging portions varying at different portions throughout its length so that relative movement between said elements causes one of said elements to move bodily toward or away from the center of rotation of the other element.

4. A mechanical movement comprising a driving element and a driven element, one of said elements comprising a wheel having the peripheral portion thereof presenting oppositely inclined, substantially conical faces, the other element comprising a channel bar engaging the conical faces and having the legs of the channel spread varying distances apart so that relative movement between said elements causes engagement therebetween at points varying between the center of rotation of the wheel and the periphery thereof.

5. A mechanical movement comprising a driving element and a driven element, one of said elements comprising a wheel having a groove in its periphery, said groove presenting opposed, substantially conical faces, the other element comprising a channel bar engaging the conical faces of said groove and varying in width at different portions throughout its length so that relative movement between said elements causes engagement therebetween at points varying between the center of rotation of the wheel and the periphery thereof.

6. A mechanical movement comprising a driving element and a driven element, one of said elements comprising a wheel having a groove in its periphery, said groove presenting opposed, substantially conical faces, the other element comprising a bar engaging the conical faces and having the legs of the channel spread varying distances apart so that relative movement between said elements causes engagement therebetween at points varying between the center of rotation of the wheel and the periphery thereof.

7. A mechanical movement comprising a driving element and a driven element, one of said elements comprising a wheel having a peripheral portion composed of oppositely inclined conical faces converging towards each other from the axis of rotation of said wheel toward the periphery thereof, the other element comprising an inverted, substantially U-shaped bar having the legs of the U engaging the oppositely inclined conical surfaces, said bar having the legs spread varying distances apart throughout the length of the bar so that relative movement between said elements effects engagement therebetween at points varying between the center of rotation of the wheel and the periphery thereof.

8. A mechanical movement comprising a driving element and a driven element, one of said elements comprising a wheel having the peripheral portion thereof presenting oppositely inclined, substantially conical faces, the other element comprising a bar engaging the conical faces and varying in width at different portions throughout its length so that relative movement between said elements causes one of said elements to move bodily toward or away from the center of rotation of the other element, and spring means for urging said elements into engagement with each other.

9. A mechanical movement comprising a driving element and a driven element, one of said elements comprising a wheel having the peripheral portion thereof presenting oppositely inclined, substantially conical faces, the other element comprising a member engaging the conical faces and having the distance between its effective conical-face engaging portions varying so that relative movement between the driving and driven elements produces acceleration or deceleration of speed of the driven element.

10. A mechanical movement comprising a wheel having the peripheral portion thereof presenting oppositely inclined, substantially conical faces, a member engaging said conical faces and having the distance between its effective conical-face engaging portions varying at different portions thereof so that relative movement between said wheel and member causes said member to engage the conical faces of the wheel at varying distances from the axis of rotation of the wheel.

WILLIAM L. CALLENDER.